United States Patent

Suha et al.

[11] Patent Number: 5,843,856
[45] Date of Patent: Dec. 1, 1998

[54] GLASS COMPOSITION

[75] Inventors: Zoltan Suha, Budapest; Zsuzsanna Varga, Dunakeszi, both of Hungary

[73] Assignee: General Electric Company, Schenectady, N.Y.

[21] Appl. No.: 784,116

[22] Filed: Jan. 15, 1997

[30] Foreign Application Priority Data

Jan. 24, 1996 [HU] Hungary ............................... P9600148

[51] Int. Cl.⁶ ................................................ C03C 3/093
[52] U.S. Cl. ............................... 501/67; 501/65; 501/66; 501/68; 501/69; 501/70; 313/493
[58] Field of Search ..................... 501/67, 65, 66, 501/68, 69, 70; 313/493

[56] References Cited

U.S. PATENT DOCUMENTS

| | | | |
|---|---|---|---|
| 4,312,952 | 1/1982 | Carbol | 501/67 |
| 4,540,672 | 9/1985 | Boudot et al. | 501/67 |
| 4,562,161 | 12/1985 | Mennemann et al. | 501/67 |
| 4,565,791 | 1/1986 | Boudot et al. | 501/67 |
| 5,077,240 | 12/1991 | Hayden et al. | 501/67 |
| 5,403,789 | 4/1995 | Kerko et al. | 501/67 |
| 5,405,811 | 4/1995 | Kerko et al. | 501/67 |
| 5,525,553 | 6/1996 | Brocheton et al. | 501/67 |

FOREIGN PATENT DOCUMENTS

| | | | |
|---|---|---|---|
| 19600 | 11/1980 | European Pat. Off. | 501/67 |
| 54-031413 | 3/1979 | Japan | 501/67 |
| 55-007510 | 1/1980 | Japan | 501/67 |
| 2029401 | 3/1980 | United Kingdom | 501/67 |
| 2034300 | 6/1980 | United Kingdom | 501/67 |

*Primary Examiner*—Anthony Green
*Attorney, Agent, or Firm*—Fay, Sharpe, Beall, Fagan, Minnich & McKee

[57] ABSTRACT

The invention relates to a glass composition for electric lamps which glass composition comprises $SiO_2$, $Al_2O_3$, $Na_2O$, $K_2O$ and $B_2O_3$ as well as optionally $Li_2O$, CaO, MgO, SrO, $Sb_2O_3$, $Fe_2O_3$, $MnO_2$ and/or $CeO_2$. The composition according to the invention is characterized in that it, in addition to the components listed, comprises ZnO and optionally $TiO_2$ and/or $P_2O_5$ as well, its $Al_2O_3$ content is 0.3 to 2 mass %, ZnO content is 2.5 to 8 mass %, $B_2O_3$ content is 1.5 to 7.5 mass % and the total amount of $Al_2O_3$ and $TiO_2$ is at least 1 mass %, while the total amount of MgO and ZnO is equal to or greater than the amount of $B_2O_3$. The invention also relates to stems and bulbs made of the glass composition according to the invention.

16 Claims, 1 Drawing Sheet

GLASS COMPOSITION

The invention is related to a glass composition which is suitable for use primarily in electric light sources.

Some glass parts of electric lamps such as stems of incandescent and fluorescent lamps and the exhaust tubes thereof as well as the bulbs of some fluorescent lamps have been made of glasses with relatively high (20 to 29 mass %) lead oxide content for a long time. This high lead oxide content provides for the high electric resistance expected and, at the same time, for the acceptable softness and good workability of the glass material.

It is known, however, that lead containing glass, in the form of waste produced both during lamp manufacturing and at the users, exerts harmful effects on the environment. Thus, based on environment protection considerations, one has to make efforts to reduce/eliminate lead content in/from mass products made of glass. Lead-free glass compositions are disclosed in European patent application No. 603 933 for use in electric lamps. Although the glass compositions described in it well approximate the lead-containing ones as to their application parameters (e.g. electrical resistance, workability, thermal expansion), it represents a serious disadvantage that they, in addition to the components ($SiO_2$, $Al_2O_3$, $Na_2O$, $K_2O$, $Li_2O$, CaO, MgO) used normally in glass compositions, contain a substantial amount of the oxides of barium and strontium (7 to 11 mass % BaO, 1 to 5 mass % SrO). Although BaO is less hazardous than PbO according to present environmental specifications, it is still strongly poisonous and its use is to be avoided first of all for labor hygiene considerations.

We have set ourselves the objective to create a glass composition for use primarily in electric lamps which glass composition does not contain poisonous PbO and BaO and in some cases is free of SrO as well. At the same time, its parameters decisive with respect of the applicability in electric lamps are at least equivalent to those of the known compositions containing BaO and SrO.

Our investigations have led to the recognition that by appropriately choosing the components of the glass composition, the use of BaO and, in some cases, that of SrO can be avoided without the impairment of application parameters. Some application parameters of the new glass compositions will even be more favorable either than those of the known PbO- or those of the known BaO- and SrO-containing compositions.

Thus, the invention relates to a glass composition for electric lamps which glass composition comprises $SiO_2$, $Al_2O_3$, $Na_2O$, $K_2O$ and $B_2O_3$ as well as optionally $Li_2O$, CaO, MgO, SrO, $Sb_2O_3$, $Fe_2O_3$, $MnO_2$ and/or $CeO_2$. The composition according to the invention is characterized in that it, in addition to the components listed comprises ZnO and optionally $TiO_2$, and/or $P_2O_5$ as well, it has an $Al_2O_3$ content of 0.3 to 2 mass %, a ZnO content of 2.5 to 8 mass %, a $B_2O_3$ content of 1.5 to 7.5 mass % and a total amount of $Al_2O_3$ and $TiO_2$ in at least 1 mass %, while the total amount of MgO and ZnO is equal to or greater than the amount of $B_2O_3$.

The $SiO_2$ content of the glass compositions according to the invention may be 61 to 73 mass %. Within this range, the compositions with 61 to 67 mass % $SiO_2$ are particularly suitable for making stem glasses, while those with 68 to 73 mass % $SiO_2$ are particularly suitable for making bulb glasses for incandescent and/or fluorescent lamps.

BRIEF DESCRIPTION OF THE DRAWINGS

The invention will take form in various components and arrangements of components, and in various steps and arrangements of steps. The drawings are only for purposes of illustrating a preferred embodiment and are not to be construed as limiting the invention.

Figure 1:
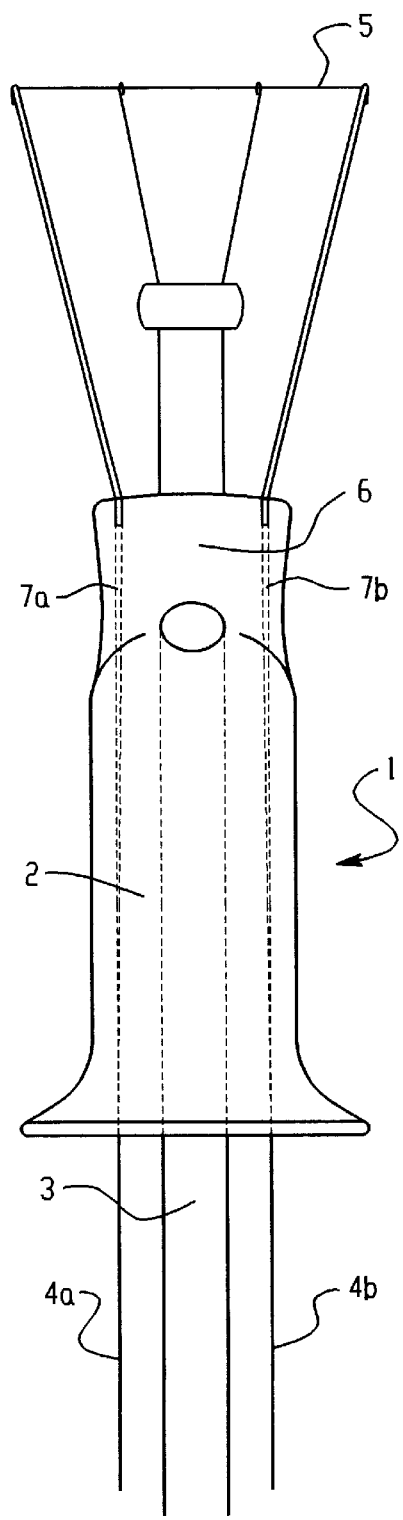
FIG. 1 illustrates a stem of an incandescent lamp of the present invention.

In the glass compositions according to the invention, the total amount of $Al_2O_3$ and $TiO_2$ must reach or exceed 1 mass %, i.e. $Al_2O_3+TiO_2 \geq 1$. In cases when the composition contains $Al_2O_3$ in an amount less than 1 mass %, the presence of $TiO_2$ is necessary, and in other cases it is advantageous. The amount of $TiO_2$ may preferably be maximum 2.5 mass %. For making stem glasses, compositions with 0.2 to 2.2 mass % $TiO_2$ are particularly suitable. By adjusting the total amount of $Al_2O_3$ and $TiO_2$ according to the above, the glass will be stabilized in structure, i.e. its susceptibility to crystallization will decrease or its liquidus temperature will be lowered. Glass compositions usually applied in electric lamps contain no $TiO_2$ with the exception of $TiO_2$ content of the contaminants introduced accidentally by raw materials, e.g. by the sand.

Similarly, ZnO is not an usual component of glass compositions applied in electric lamps. In addition to ZnO, the composition preferably contains MgO in an amount of maximum 3.7 mass %. ZnO content of compositions suitable for stem glasses and bulb glasses is to be preferably chosen in the upper and the lower part of the range of the above values, respectively. The amount of MgO may preferably be 0.2 to 2.5 mass % and, within this range, it may be preferably be 0.5 to 2.5 mass % and 0.2 to 1 mass % for stem glasses and bulb glasses, respectively.

In the glass compositions according to the invention, the amount of ZnO (and of MgO being present optionally) must reach at least that of $B_2O_3$ i.e. $MgO+ZnO \geq B_2O_3$. This proportion is necessary for ensuring good chemical resistance and favorable workability parameters of the glass.

The amount of $B_2O_3$ may preferably be 2 to 7 mass % and, within this range it may preferably be 4 to 7 mass % and 2 to 4 mass % for stem glasses and bulb glasses, respectively.

The total alkali metal content of the glass compositions according to the invention may be 14 to 24 mass %. Within this range, the compositions may contain 6 to 10 mass % $Na_2O$, 8 to 12.5 mass % $K_2O$ and optionally maximum 1.4 mass % $Li_2O$. The amount of $K_2O$ preferably reaches or exceeds that of $Na_2O$. Preferably the glass composition contains $Na_2O$, $K_2O$ and $Li_2O$ in a total amount of 14 to 24 mass percent.

In the compositions according to the invention, the presence of CaO is not indispensable, however it is preferable that the compositions to be used in bulb glasses contain CaO as well. The amount of CaO in these compositions is preferably maximum 1.2 mass % and it is advantageous to choose 0.3 to 0.9 mass %. It is also preferable if the total amount of $K_2O$ (and of CaO being present optionally) reaches or exceeds that of $Na_2O$, i.e. $CaO+K_2O \geq Na_2O$ in the compositions, primarily in those to be used in bulb glasses. As a result of these measures, the escape of Na leading to the capture of mercury or the discoloration of phosphor in fluorescent lamp bulbs can be effectively suppressed.

As an auxiliary agent for structure stabilization, the glass compositions may optionally contain also $P_2O_5$ in a maximum amount 0.6 mass %. The $P_2O_5$ content of compositions to be used in bulb glasses may be e.g. 0.1 to 0.6 mass % and preferably 0.2 to 0.45 mass %.

As mentioned above, the compositions according to the invention do not require the presence of SrO in general. The amount of SrO being present occasionally does not exceed 2 mass %.

In addition to the components described in detail previously, the compositions according to the invention may, in order to reduce the UV emission of the lamps, optionally also contain the following materials: $Sb_2O_3$ in amounts of maximum 0.5 mass %, $Fe_2O_3$ in amounts of maximum 0.15 mass %, $MnO_2$ in amounts of maximum 0.25 mass % and/or $CeO_2$ in amounts of maximum 0.8 mass %. These materials also act as a fining agent in some cases. Some of the components may already be present as contaminants in the starting mix of glass melting thus eliminating the need of being added separately.

The glass compositions according to the invention can be good replacements for the presently used lead glasses with respect to the thermal expansion, viscosity values being characteristic of workability, and electric resistance which parameters among others determine applicability of compositions in electric lamps. Thus, these compositions are equivalent to those containing BaO and SrO described in European patent application No. 603 933. However, their liquidus temperature value ($T_{liq}$), a parameter characterizing susceptibility to crystallization, is lower than that of the materials according to the European patent application No. 603 933 and is significantly lower than that of the lead glass. This indicates favorable, i.e. very weak susceptibility to crystallization of the glass compositions according to the invention. The intensity of their crystallization below the liquidus temperature is also better than that of the lead glass, some glass compositions have not shown crystallization at all in a 24-hour test.

The glass compositions according to the invention have outstanding resistance to chemical corrosion which is an extremely good achievement taking into account their high alkali metal oxide content. It is also a novel feature that the viscosity of the glass compositions according to the invention meets the requirements of workability of glass and lampmaking notwithstanding that the literature including the European patent application No. 603 933 considers the presence and quantity limits of BaO as a critical factor for workability.

For the components and application parameters of the glass composition according to the invention, the following example is shown.

EXAMPLE

The glass compositions given in Table I were melted by 350-kg batches at 1400° to 1470° C. in an intermittently-running natural gas-heated tank furnace. The components listed in Table I were added in the following forms: $SiO_2$ as quartz sand, $Al_2O_3$ as alumina, $B_2O_3$ as dehydrated borax, alkali earth oxides as the corresponding carbonates, CaO and MgO as dolomite or MgO, $P_2O_5$ as Ca- or Na- phosphate. The further materials listed were added in the form of the corresponding oxides. Where 0.02 mass % $Fe_2O_3$ is seen in Table I, it was contained in the quartz sand. Sodium nitrate was used as a fining agent. The components were, except for the quartz sand, soda ash, potash (the latter two materials are Na- and K-carbonate respectively) and dehydrated borax, previously premixed in a laboratory mixer and then added to be mixed with the further components in a mixer drum. Melting was carried out after 30 minutes of homogenizing by making use of the process normally applied in the glass industry. The mass % values and application parameters of the glass compositions are summarized in Tables I and II, respectively. Glass compositions No. 1 and 2 are primarily suitable for making stem glasses and so is glass composition No. 3 for making fluorescent lamp bulb glasses. For comparison, Table II also shows the corresponding data of a known glass composition with 20% PbO content (designated with P in Table II) and those of the glass composition described in European patent application No. 603 933 (designated with B in Table II). The meaning of the further designations used in Table II is as follows:

$\simeq_{(50-350)}$: thermal expansion coefficient between 50° and 350° (according to ISO Standard 7991)

$T_g$: (dilatometric) transformation temperature (according to ISO standard 7884-8)

$T_L$: Littleton softening point (according to ISO Standard 7884-6)

$T_{K100}$: the temperature where log p ($\Omega$cm)=8 (log $\rho$ is the common logarithm of the direct-current specific resistance value)

$T_{liq}$: liquidus temperature above which the glass (after a heat treatment of 24 hours) shows no crystallization ("no": shows no crystallization at all after 24 hours) Water durability: chemical resistance to distilled water (extraction) as measured on crushed glass and characterized by the quantity of 0.01N acid consumed for back titration (according to DIN Standard 12111)

$T_{work}$: work working temperature where the viscosity value $\eta$ is $10^4$ dpas.

TABLE I

| | Quantity in mass % | | |
|---|---|---|---|
| Component | No. 1 | No. 2 | No. 3 |
| $SiO_2$ | 63.98 | 66.40 | 70.15 |
| $Al_2O_3$ | 0.95 | 1.55 | 1.25 |
| $Na_2O$ | 7.17 | 7.57 | 8.37 |
| $K_2O$ | 10.35 | 9.75 | 11.47 |
| $Li_2O$ | 1.00 | 1.00 | 0 |
| CaO | 0.02 | 0.02 | 0.40 |
| MgO | 1.27 | 1.18 | 0.29 |
| ZnO | 6.96 | 5.72 | 4.17 |
| $B_2O_3$ | 6.02 | 5.02 | 3.09 |
| $TiO_2$ | 1.81 | 1.33 | 0.02 |
| $P_2O_5$ | 0 | 0 | 0.30 |
| $Sb_2O_3$ | 0.30 | 0.30 | 0 |
| $Fe_2O_3$ | 0.02 | 0.02 | 0.03 |
| $MnO_2$ | 0.15 | 0.15 | 0 |
| $CeO_2$ | 0 | 0 | 0.46 |

TABLE II

| Physical parameter | Glass sample | | | | |
|---|---|---|---|---|---|
| | No. 1 | No. 2 | No. 3 | "P" | "B" |
| $\alpha_{(50-350)} \times 10^{-7}$ (1°/C.) | 98.6 | 98.3 | 101 | 98.9 | |
| $\alpha_{(25-300)} \times 10^{-7}$ (1°/C.) | | | | | 92.5 |
| $T_g$ (°C.) | 500 | 506 | 502 | 411 | |
| $T_L$ (°C.) | 667 | 668 | 693 | 630 | 675 |
| $T_{work}$ (°C.) | 890 | 960 | 1010 | 1000 | 1020 |
| $T_{k100}$ (°C.) | 290 | 282 | 245 | 280 | 290 |
| Water durability (ml/g) | 0.33 | 0.45 | 1.4 | 2.5 | |
| Density (g/cm³) | 2.584 | 2.553 | 2.506 | 2.8 | 2.62 |
| $T_{Liq}$ (°C.) | 820 | no | 790 | 850 | 840 |

The glass composition according to the invention can, of course, be used in all fields where the advantages provided by the properties of the glass are needed, especially for glass parts of electric lamps. The glass composition according to the invention can be applied primarily for stems and exhaust tubes of incandescent filament lamps and low-pressure discharge lamps as well as for bulbs and exhaust tubes of low-pressure discharge lamps, preferably compact fluorescent lamps.

The subject of the invention also includes those glass parts of electric lamps the material of which consists of glass composition according to the invention.

Figure 2:
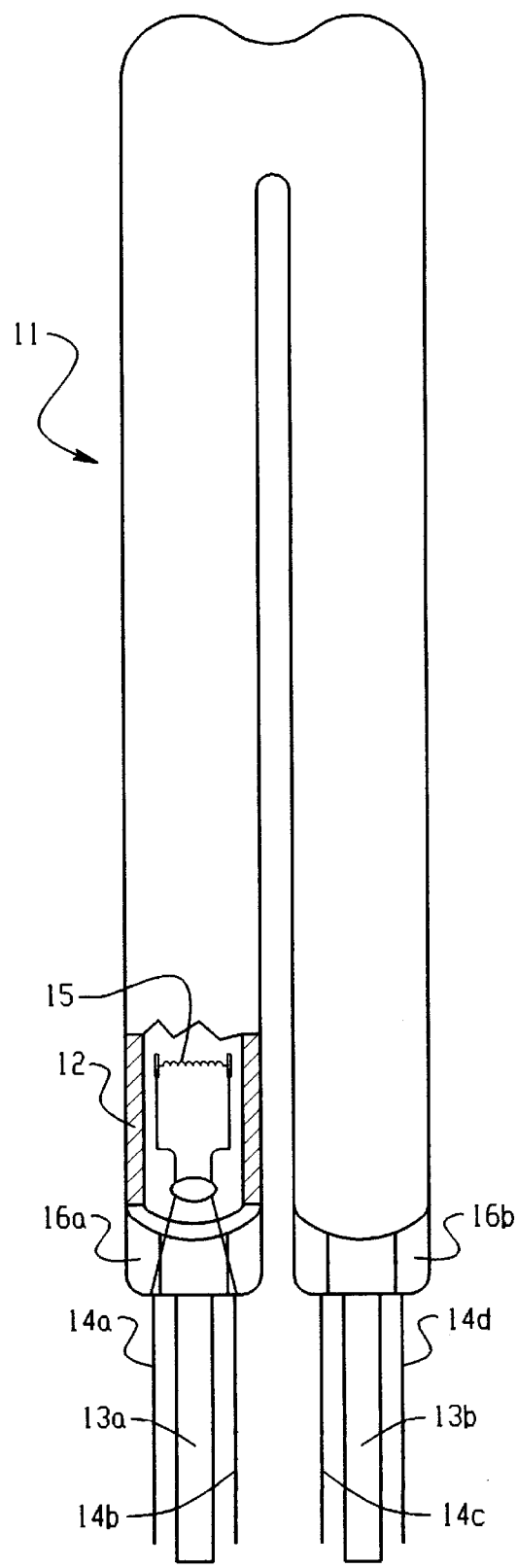
FIG. 2 illustrates a compact fluorescent lamp of the present invention.

As examples, a stem of an electric lamp and that of a compact fluorescent lamp are illustrated in FIGS. 1 and 2, respectively.

In FIG. 1, a stem 1 of an incandescent lamp is seen which consists of a stem flare 2, current feedthroughs 4a and 4b, an incandescent filament 5 and an exhaust tube 3. The filament 5 is clamped between the ends of the multiple-part current feedthroughs 4a and 4b. On the production line, the listed parts are heated by flames and having stem flare 2 pinched, the parts are sealed so that the dumet parts (iron-nickel alloy with a copper mantle) 7a and 7b of the current feedthroughs 4a and 4b are placed inside the pinched portion 6 of the stem flare 2. The material of the stem flare 2 and the exhaust tube 3 is the glass composition according to the invention. The material of the lamp bulb (not shown) is an alkali-lime silicate soft glass comprising the following base components: $SiO_2$, $Na_2O$, $K_2O$, $CaO$, $MgO$, $Al_2O_3$. On the production line, the stem flare 2 is sealed at its flanged portion in the lamp bulb.

The stem according to the invention may be not only a stem of an incandescent lamp but that of an electric lamp of another type also, e.g., a low-pressure discharge lamp, particularly a linear fluorescent lamp.

In FIG. 2 a compact fluorescent lamp 11 comprising two tube portions is seen. Current feedthroughs 14a and 14b of electrode 15 and current feedthroughs 14c and 14d of the other electrode (not shown) as well as exhaust tubes 13a and 13b are sealed in the ends of bulb 12 at pinched portion 16a and 16b. The material of the current feedthroughs 14a, 14b, 14c, and 14d is a 50/50% nickel-iron alloy. The material of the bulb 12 and the exhaust tubes 13a, 13b is the glass composition according to the invention. The material of the bulb 12 contains $CeO_2$ in a mass percent over 0%, preferably in 0.4 to 0.6 mass % in order to filter UV radiation.

What we claim is:

1. An electric lamp glass composition which is substantially free of PbO and BaO and comprising, expressed in terms of mass percent:

| | |
|---|---|
| $SiO_2$ | 61–73 |
| $Al_2O_3$ | 0.3–2 |
| $B_2O_3$ | 1.5–7.5 |
| $Na_2O + K_2O + Li_2O$ | 14–24 |
| ZnO | 2.5–8 |
| CaO | 0–1.2 |
| MgO | 0–3.7 |
| SrO | 0–2 |
| $Sb_2O_3$ | 0–0.5 |
| $Fe_2O_3$ | 0–0.15 |
| $MnO_2$ | 0–0.25 |
| $CeO_2$ | 0–0.8 |
| $TiO_2$ | 0–2.5 |
| $P_2O_5$ | 0–0.6 |

$Al_2O_3 + TiO_2 \geq 1$
$ZnO + MgO \geq B_2O_3$.

2. Glass composition according to claim 1 wherein the glass composition contains $TiO_2$ in an amount of 0.2 to 2.2 mass %.

3. Glass composition according to claim 1 wherein the glass composition contains MgO in an amount of 0.5 to 2.5 mass %.

4. Glass composition according to claim 1 wherein the glass composition contains ZnO in an amount of 5 to 8 mass %.

5. Glass composition according to claim 1 wherein the glass composition contains $B_2O_3$ in an amount of 4 to 7 mass %.

6. Glass composition according to claim 1 wherein the amount of $K_2O$ is at least equal to that of $Na_2O$.

7. Glass composition according to claim 1 wherein the glass composition contains $TiO_2$ in a maximum amount of 0.5 mass %.

8. Glass composition according to claim 1 wherein the glass composition contains MgO in an amount of 0.2–1 mass %.

9. Glass composition according to claim 1 wherein the glass composition contains ZnO in an amount of 3–5 mass %.

10. Glass composition according to claim 1 wherein the glass composition contains $B_2O_3$ in an amount of 2–4 mass %.

11. Glass composition according to claim 1 wherein the total amount of CaO and $K_2O$ is at least equal to that of $Na_2O$.

12. Glass composition according to claim 1 wherein the glass composition contains $P_2O_5$ in an amount of 0.2–0.35 mass %.

13. Stem for electric lamps, across which current feedthroughs are introduced and sealed in a vacuum-tight manner, and the said stem is sealed in a vacuum tight-manner in a bulb of the lamp, the stem comprising a glass composition comprising, expressed in terms of mass percent:

| | |
|---|---|
| $SiO_2$ | 61–73 |
| $Al_2O_3$ | 0.3–2 |
| $B_2O_3$ | 1.5–7.5 |
| $Na_2O + K_2O + Li_2O$ | 14–24 |
| ZnO | 2.5–8 |
| CaO | 0–1.2 |
| MgO | 0–3.7 |
| SrO | 0–2 |
| $Sb_2O_3$ | 0–0.5 |
| $Fe_2O_3$ | 0–0.15 |
| $MnO_2$ | 0–0.25 |
| $CeO_2$ | 0–0.8 |
| $TiO_2$ | 0–2.5 |
| $P_2O_5$ | 0–0.6 |

$Al_2O_3 + TiO_2 \geq 1$
$ZnO + MgO \geq B_2O_3$.

14. The stem of claim 13 wherein the amount of $TiO_2$ is between 0.2 and 2.2 mass %.

15. Bulb for electric lamps, the bulb comprising with a glass composition comprising, expressed in terms of mass percent:

| | |
|---|---|
| $SiO_2$ | 61–73 |
| $Al_2O_3$ | 0.3–2 |
| $B_2O_3$ | 1.5–7.5 |
| $Na_2O + K_2O + Li_2O$ | 14–24 |
| ZnO | 2.5–8 |
| CaO | 0–1.2 |
| MgO | 0–3.7 |
| SrO | 0–2 |
| $Sb_2O_3$ | 0–0.5 |
| $Fe_2O_3$ | 0–0.15 |
| $MnO_2$ | 0–0.25 |
| $CeO_2$ | 0–0.8 |
| $TiO_2$ | 0–2.5 |
| $P_2O_5$ | 0–0.6 |

$Al_2O_3 + TiO_2 \geq 1$
$ZnO + MgO \geq B_2O_3$.

16. The bulb of claim 15 wherein the amount of $TiO_2$ does not exceed 0.5 mass %.

* * * * *